Aug. 7, 1923.
E. M. IVIE
1,463,893
TRUCK FRAME FOR RAILWAY CARS
Filed June 20, 1922     4 Sheets-Sheet 1
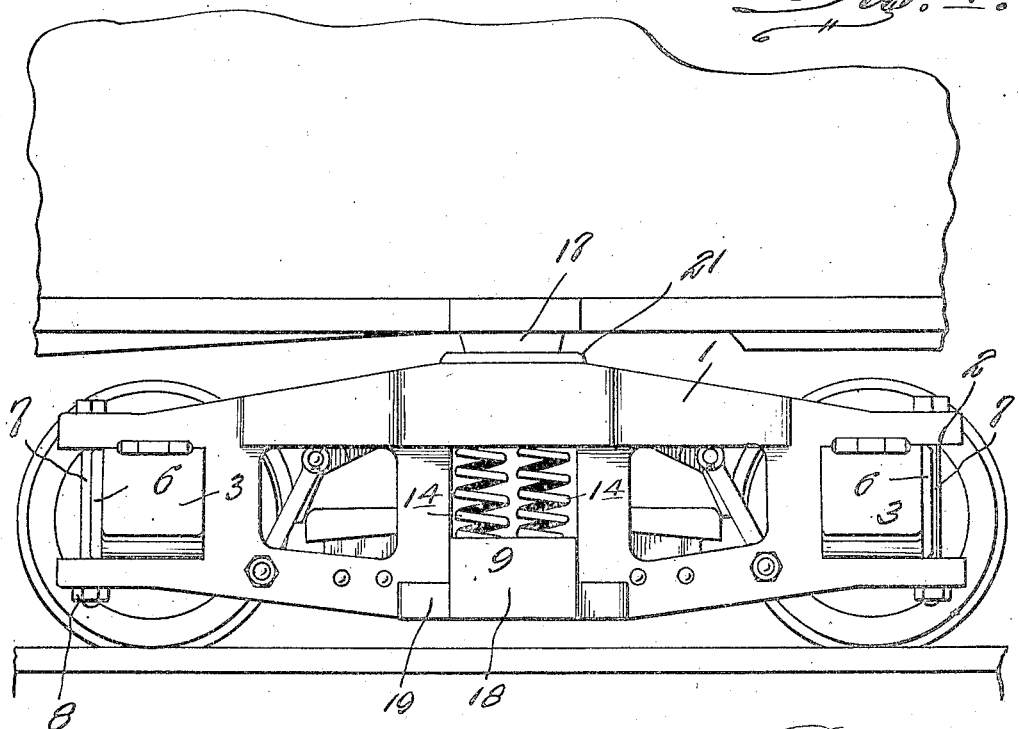
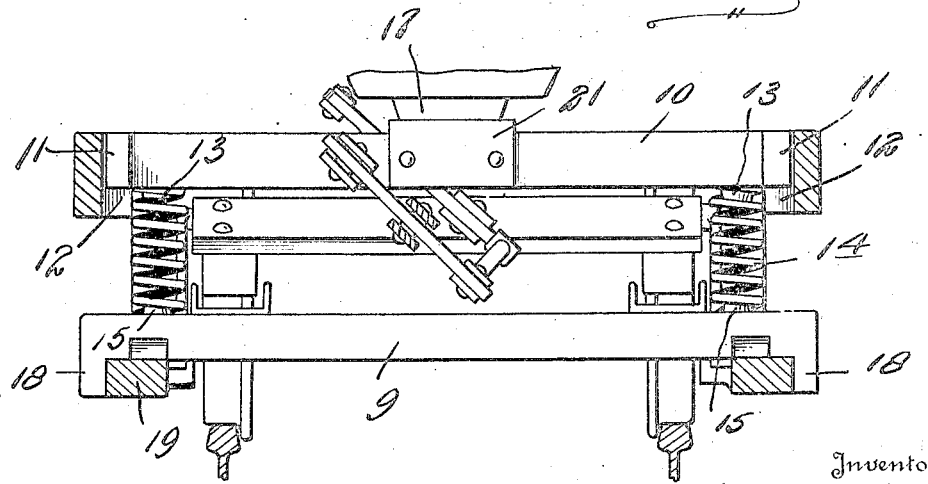
Witnesses:
Inventor
E. M. Ivie,
By Clarence A. O'Brien
Attorney

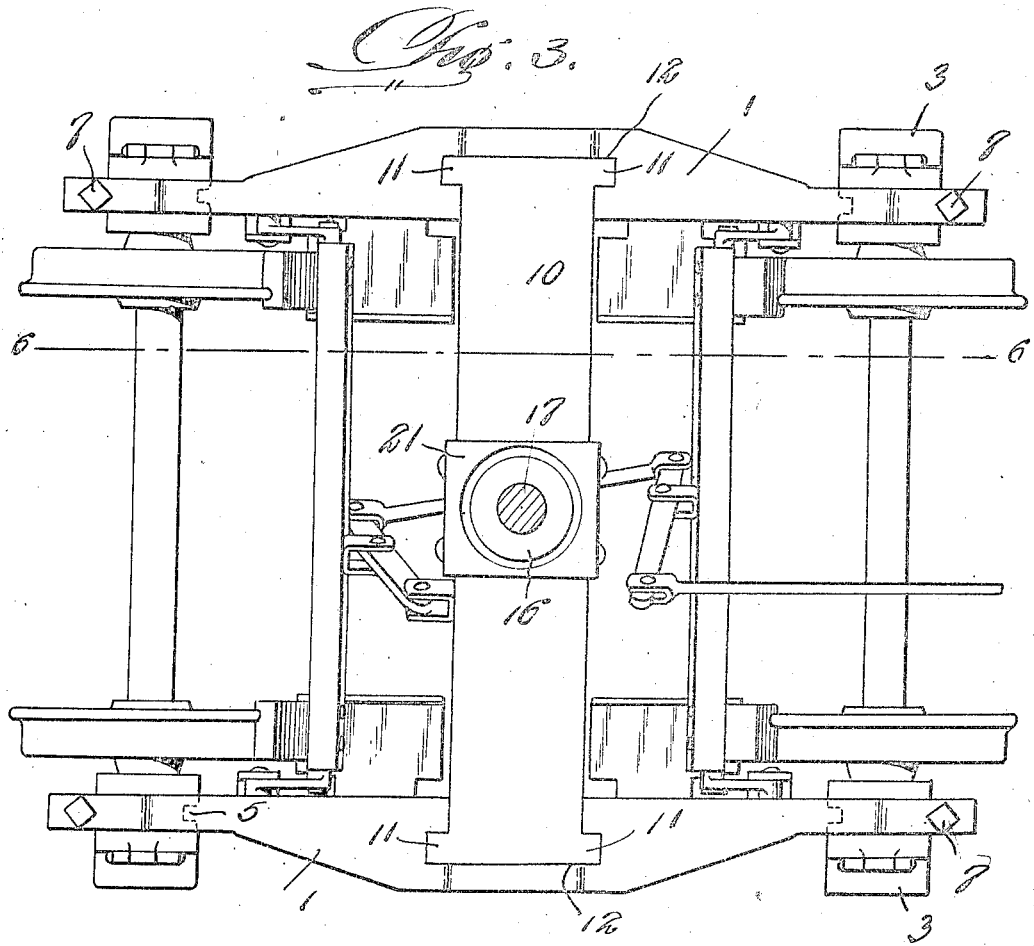
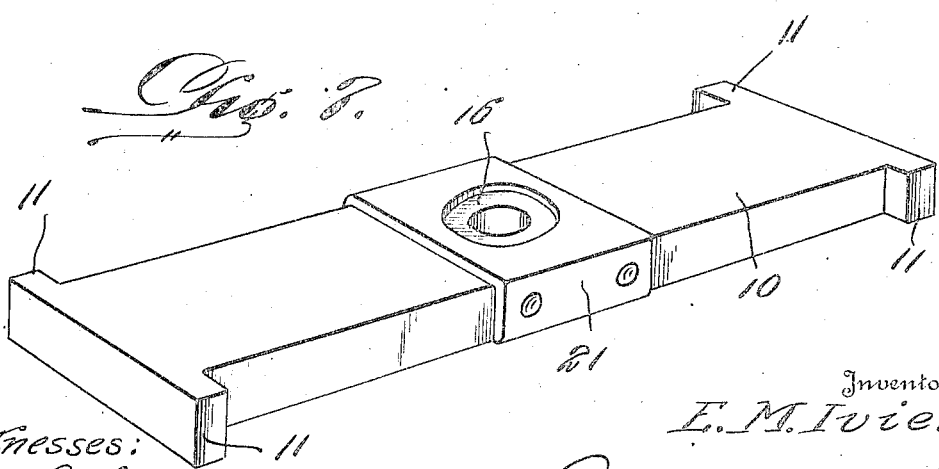

Aug. 7, 1923.
E. M. IVIE
1,463,893
TRUCK FRAME FOR RAILWAY CARS
Filed June 20, 1922 4 Sheets-Sheet 3
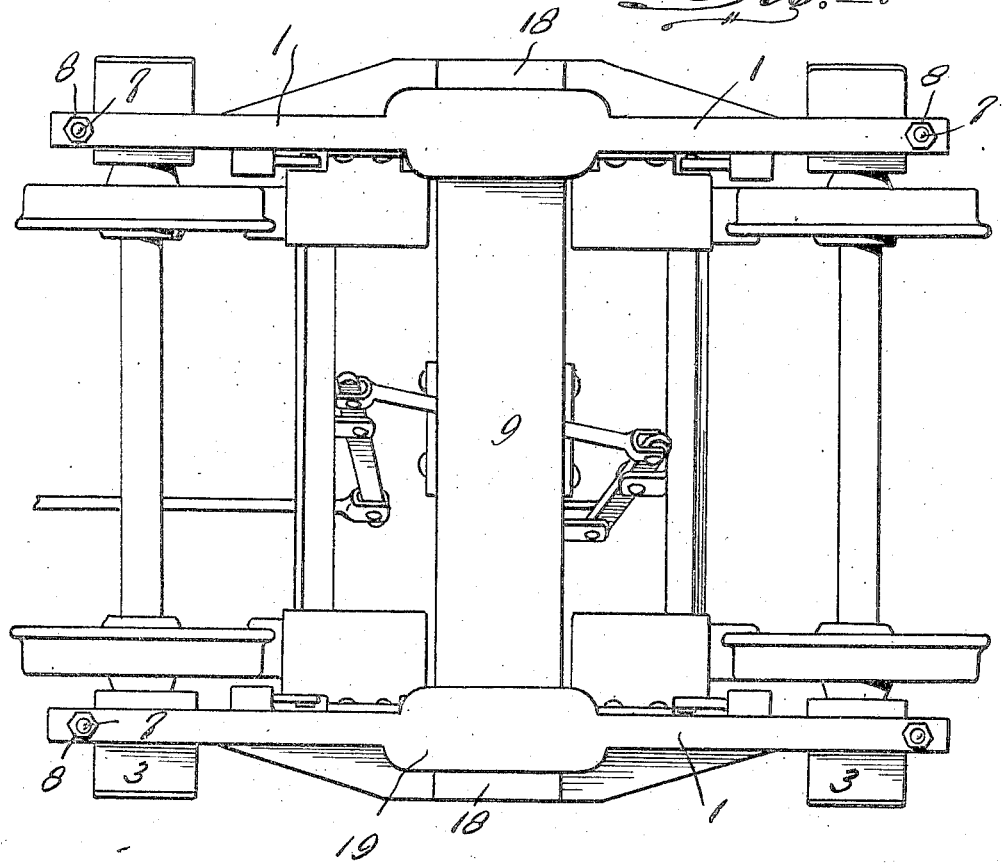
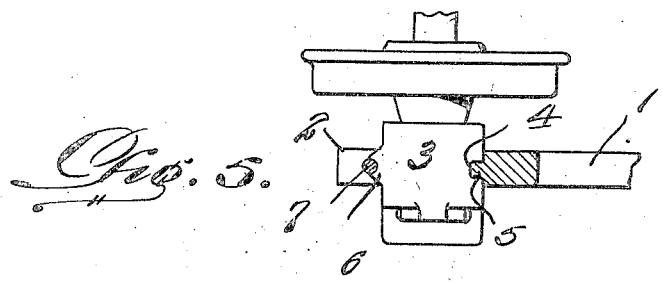

Aug. 7, 1923.
E. M. IVIE
1,463,893
TRUCK FRAME FOR RAILWAY CARS
Filed June 20, 1922  4 Sheets-Sheet 4
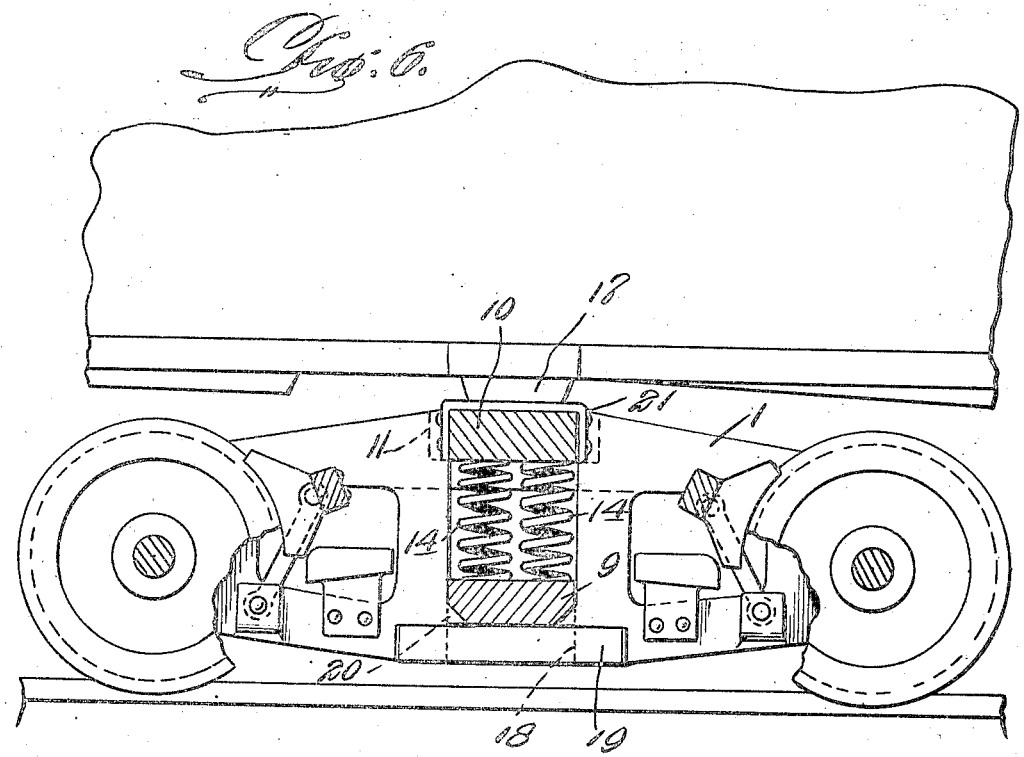
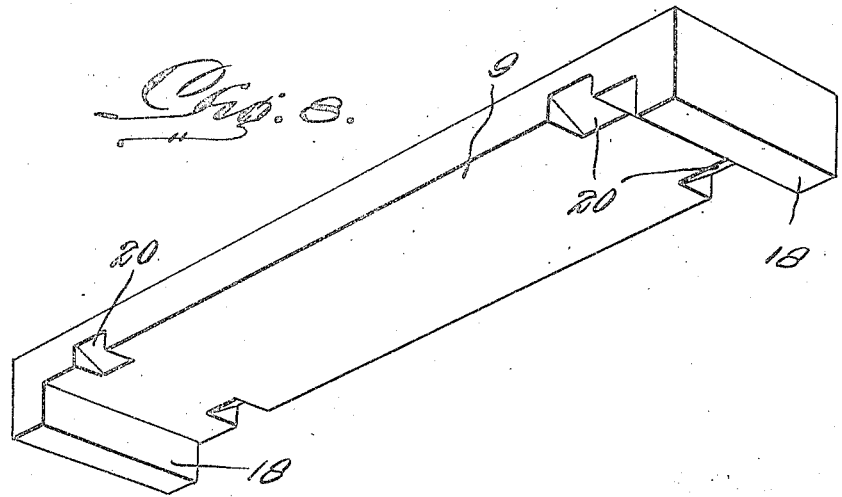

Patented Aug. 7, 1923.

1,463,893

UNITED STATES PATENT OFFICE

EMORY M. IVIE, OF ATLANTA, GEORGIA.

TRUCK FRAME FOR RAILWAY CARS.

Application filed June 25, 1922. Serial No. 560,705.

*To all whom it may concern:*

Be it known that I, EMORY M. IVIE, a citizen of the United States, residing at Atlanta, in the county of Fulton and State of Georgia, have invented new and useful Improvements in Truck Frames for Railway Cars, of which the following is a specification.

The object of my said invention is the provision of a truck frame that may be readily taken down and reassembled; the said truck frame being characterized by a spring plank that is locked in position so that the heavier the load the stronger the frame, and yet may be readily removed and replaced, and the truck frame being also characterized by a bolster that is easy to take out and to replace in a very short time.

In order to remove the truck frame under a car for repairs or otherwise, a cable can be fastened under the bolster and to the body of the car, and the bolster may be raised with the car body, and when the bolster is put back in position it is safe for the workmen because they do not have to get under the car body to put the center pin in position as in the truck frame construction extant.

My novel truck frame is further advantageous because of the general facility with which it may be taken down and reassembled, the frame including the provision of only four bolts.

The truck frame is further advantageous in that it includes a safety bracket which projects outwardly under the brake head and brake shoes to catch the brake beam and prevent it from falling under the wheels and derailing the train.

Other objects and practical advantages of my invention will be fully understood from the following description and claims when the same are read in connection with the accompanying drawings, in which:—

Figure 1 is a side elevation illustrating the truck frame constituting the best practical embodiment of my invention that I have as yet devised.

Figure 2 is a transverse section of the same.

Figure 3 is a horizontal section showing a portion of the truck frame in plan.

Figure 4 is a top plan view of the truck frame.

Figure 5 is a detail section showing the manner of arranging the axle boxes in the side members of the frame.

Figure 6 is a longitudinal vertical section taken in the plane indicated by the line 6—6 of Figure 3.

Figure 7 is a detail perspective of the bolster hereinafter referred to as the top bolster.

Figure 8 is a detail perspective of the spring-plank of my improvement.

Similar numerals of reference designate corresponding parts in all of the views of the drawings.

Among other elements my novel truck frame comprises side members 1, bifurcated at their ends as designated by 2 to receive axle boxes 3. At the inner ends of the bifurcations 2 the members 1 are provided with upright keys 4 which are let into corresponding recesses 5 in the axle boxes 3 as clearly shown in Figure 5. At their outer sides the axle boxes 3 are provided with ears 6, and between the ears 6 on each axle box is arranged a bolt 7 secured by a nut 8 in the upper and lower portion of the frame. In virtue of this construction it will be apparent that the side members 1 are maintained in a strong and secure though detachable alinement with the axle boxes 3 as is desirable.

The truck frame also comprises a spring plank 9 and a top bolster 10. The said top bolster 10 is provided at its ends with T-heads 11, arranged to float in corresponding recesses 12 of the side members 1, Figures 2 and 3. It will also be noticed in this connection that the top bolster 10 is provided at its underside with teats 13 which are disposed in the upper ends of coil springs 14. The lower ends of the said coil springs 14 surround teats 15 on the spring plank 9 with the result that the top bolster 10 is adequately cushioned so as to enable the truck frame to absorb the shocks and jars.

In its upper side the top bolster 10 is provided with a socket 16 to receive the king bolt construction 17 on a car body, the said king bolt construction being preferably of the ordinary well known construction though it may be of any other construction compatible with the purpose of my invention.

The spring plank 9 is provided at its ends with pendent flanges 18. The said spring plank is supported by the side members 1 as appears clearly in Figure 2, and the pendent flanges 18 are hooked over lugs 19 on the lower portion of the side members 1 so as to enable the spring plank of itself to strongly hold the side members 1 against outward movement. It will also be noticed by particular reference to Figure 8 that the spring plank 9 is recessed at the points 20 in order to enable it to snugly fit the truck frame.

At the point 21 the top bolster 10 is provided by preference with the ordinary wear-plate.

It will be apparent from the foregoing that a truck frame constructed as herein illustrated and described is possessed of all of the practical advantages ascribed to my invention, and it will also be apparent that the truck frame is simple in construction and is well adapted to withstand the rough usage to which truck frames are ordinarily subjected.

I illustrate the truck frame as equipped with brakes, but this need not be described in detail inasmuch as they constitute the subject of my contemporary application of even date herewith. I would have it understood, however, in this connection that my present invention relates to the truck frame per se, and the said truck frame may be equipped with the brakes shown or with any other brakes, or the brakes may be altogether omitted from the truck frame without involving departure from the scope of my present invention as claimed.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

1. In a truck frame, the combination of side members, a spring plank detachably interlocked with and supported by said side members, a floating bolster yieldingly supported upon the said spring plank and detachably interlocked with the side members, the said interlocking of the floating bolster being effected by T heads at the ends thereof disposed in correspondingly shaped recesses in the side members and the said interlocking of the spring plank being effected by pendent flanges at the ends thereof arranged exteriorly of portions of the side members and having recesses inwardly of the pendent flanges and at opposite sides of the plank for permitting the same to snugly fit the truck frame.

2. In a truck frame, the combination of side members, a spring plank detachably interlocked with and supported by said side members, and a floating bolster yieldingly supported upon the said spring plank and detachably interlocked with the side members, the said side members being provided with outwardly extending lugs, and the said spring plank being hooked over said lugs and having recesses adjacent its ends and at opposite sides thereof, for snugly fitting the truck frame.

In testimony whereof, I affix my signature.

EMORY M. IVIE.